Figure 1:
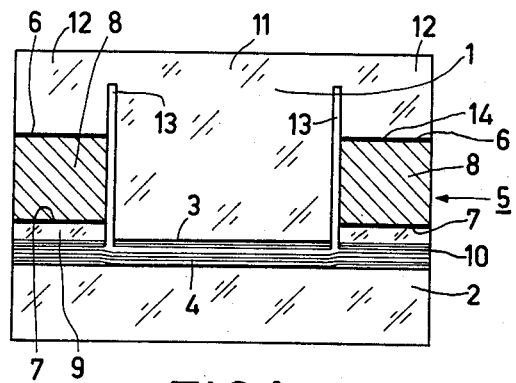

United States Patent [19]

Haisma et al.

[11] Patent Number: 4,547,801
[45] Date of Patent: Oct. 15, 1985

[54] TUNABLE FABRY-PEROT INTERFEROMETER AND X-RAY DISPLAY DEVICE HAVING SUCH AN INTERFEROMETER

[75] Inventors: Jan Haisma; Cornelis L. Adema; Johannes M. M. Pasmans; Jurren H. Walters, all of Eindhoven, Netherlands

[73] Assignee: U.S. Philips Corporation, New York, N.Y.

[21] Appl. No.: 468,233

[22] Filed: Feb. 22, 1983

[30] Foreign Application Priority Data

Mar. 24, 1982 [NL] Netherlands ................ 8201222

[51] Int. Cl.⁴ ............................................. G02B 5/28
[52] U.S. Cl. ............................... 358/111; 350/96.13; 350/166; 356/352; 358/901
[58] Field of Search ............... 350/166, 96.13, 96.14, 350/96.27; 358/111, 901; 356/352

[56] References Cited

U.S. PATENT DOCUMENTS

| | | | |
|---|---|---|---|
| 2,534,846 | 12/1950 | Ambrose | 358/42 |
| 3,058,021 | 10/1962 | Dunn | 358/111 |
| 3,477,036 | 11/1969 | Haisma | 372/107 |
| 3,652,855 | 3/1972 | McIntyre | 350/96.27 |
| 4,057,321 | 11/1977 | Mahlein | 350/96.14 |
| 4,198,115 | 4/1980 | Kaminow | 350/96.14 |
| 4,312,570 | 1/1982 | Southwell | 350/166 |
| 4,325,636 | 4/1982 | Schiffner | 350/96.15 |
| 4,365,269 | 12/1982 | Haendle | 358/111 |
| 4,400,058 | 8/1983 | Durand | 350/166 |

*Primary Examiner*—Howard W. Britton
*Attorney, Agent, or Firm*—Paul R. Miller

[57] ABSTRACT

In a tunable Fabry-Perot interferometer, the supports for two parallel mirrors consist of bundles of optical fibers with the mirrors being provided on the ends of the fibers. This structure may be used advantageously in an X-ray display device wherein the structure is located between the display screen on which the visible X-ray image is displayed and a television camera tube. By using the Fabry-Perot interferometer as a light attenuator in such a device, problems where the camera tube is overridden when making an X-ray record can be prevented by causing the reflection coefficient of the mirrors in the visible range of the spectrum to be 99% or more. Also, the half width of the transmission wavelength pass-band of the Fabry-Perot interferometer can be made less than 50 nm.

12 Claims, 4 Drawing Figures

U.S. Patent  Oct. 15, 1985  4,547,801

TUNABLE FABRY-PEROT INTERFEROMETER AND X-RAY DISPLAY DEVICE HAVING SUCH AN INTERFEROMETER

The invention relates to a Fabry-Perot interferometer having a transmission wavelength which is tunable and comprising two facing mirrors which are situated at a very small distance from each other to extend at right angles to the axis of the interferometer with the mirrors being provided on supports which are interconnected by an axially continuously adjustable spacing element.

The invention also relates to an X-ray display device including such a tunable Fabry-Perot interferometer.

Such a tunable Fabry-Petrot interferometer is disclosed in U.S. Pat. No. 2,534,846 which may be considered to be incorporated herein by reference and in which such a Fabry-Perot interferometer is described as a tunable colour filter. The mirror surfaces of the Fabry-Perot interferometer have a reflection coefficient of 50% and are situated at a distance d from each other which is between half the wavelength of blue and half the wavelength of red light (which corresponds approximately to 275 nm). Piezo-electric crystals are used as adjustable spacing elements. By means of such a tunable Fabry-Perot interferometer it is possible to select the colour of the transmitted light.

A tunable Fabry-Perot interferometer is also known as a laser resonant cavity from U.S. Pat. No. 3,477,036. One of the mirrors of the gas laser described in this patent is mounted on an electrostrictive support opposite to one end of the laser capillary. Tuning the laser resonant cavity is possible by this construction by moving the mirror which is mounted on the electrostrictive support.

Non-tunable Fabry-Perot interferometers are generally known, for example, from Fundamentals of Optics, fourth edition McGraw-Hill Kogakusha Ltd. Tokyo, pp. 301-312. An interferometer is an instrument with which either wavelengths, or path differences, or refractive index differences can be measured by means of interferences. When the distance d between the two mirrors of the Fabry-Perot interferometer is very small, only one or two transmission maxima will lie within the visible range of the wavelength scale. When white light is made incident on the Fabry-Perot interferometer, only one or two narrow wavelength bands will be passed, while the remainder of the light will be reflected. The Fabry-Perot interferometer in this case serves as a so-called comb filter which passes nearly monochromatic light for each transmission wavelength band (transmission maximum). Interference filters are made which pass a wavelength band having a half width of interference maxima of 1.5 nm with the maximum in principle at any desired wavelength.

Such tunable Fabry-Perot interferometers have a wide field of application. For example, they may be used in light measuring systems, in laser technology, in spectroscopy, as a light modulator, and as a dynamic transmission element to be placed in front of a TV camera tube so as to so provide a colour camera having only one pick-up tube.

It is an object of the invention to provide a tunable Fabry-Perot interferometer which is particularly suitable for use in an X-ray display device.

Another object of the invention is to provide an X-ray display device in which the brightness and/or the colour of the picture incident on the target of the pick-up tube can be selected.

A further object of the invention is to provide a tunable Fabry-Perot interferometer which is tunable through out the visible range of the frequency spectrum and which passes a single transmission wavelength band having a half width of less than 50 nm about the desired wavelength.

According to the invention, a tunable Fabry-Perot interferometer of the type mentioned in the opening paragraph is characterized in that the supports consists of bundles of optical fibers and the mirrors are provided on the ends of the optical fibers.

Such a tunable Fabry-Perot interferometer can be used particularly advantageously in an X-ray display device. Such a device comprises a display screen for displaying a picture on a photosensitive, for example photoconductive, target of a television camera tube. In order to obtain a good display, high-grade optical elements are necessary. These optical elements are expensive and bulky. From U.S. Pat. No. 3,058,021 it is known to use a bundle of glass fibers to relay an image from a display screen to a television camera tube as a result of which the use of expensive optical elements becomes unnecessary. However, another problem occurs. In an X-ray device the ratio of the dose of X-ray radiation necessary to position a patient in the device to the dose necessary to make an X-ray record after positioning, is for example, in the proportion of 1:100. Therefore, a light attenuator is necessary in the system in addition to the relaying fiber optics, so as to be able to compensate for the change in intensity on the display screen in accordance with the proportion before the picture is incident on the target of the camera tube. In German Patent Application No. 28 46 295 laid open to public inspection and considered to be incorporated herein by reference such an X-ray display device is described having a light attenuator, which extends at right angles to the axis of the glass fibers and which consists of a double layer having an electrically controllable permeability. This double layer which is present between two transparent electrodes consists, for example, of a layer of lithium fluoride and a layer of tungsten oxide. These electrodes are connected to a control device which co-operates with the X-ray tube so that an increase in the X-ray radiation reduces the permeability of the double layer. By using a tunable Fabry-Perot interferometer according to the invention, in which the supports consist of fiber optic bundles and the mirrors are provided at the fiber ends, as a light attenuator in an X-ray display device, it is not only possible to reduce the brightness of the picture displayed on the target of the camera tube but it is possible in addition to pass only light originating from one given wavelength pass-band.

When the display screen comprises two phosphors luminescing respectively in different colours in which the quantity of light generated upon irradiation with the same X-ray intensity, by one of the phosphors is 10 to 100 times as great as that generated by the other phosphor, it is possible while positioning the patient, during which only low intensity X-ray radiation is used, to tune to the emission wavelength of the phosphor giving a large amount of light by means of the tunable Fabry-Perot interferometer. During a radiographic exposure of the patient the X-ray intensity becomes 100× greater than during positioning, and the Fabry-Perot interferometer must then be tuned to the emission wavelength of the phosphor emitting a small amount of light. This latter phosphor is preferably a phosphor which emits light of a shorter wavelength than the other phosphor because in that case when a plumbicon is used as a camera tube (plumbicon is a trade name of N.V. Philip's Gloeilampenfabrieken) a better resolving power is obtained. The target of a plumbicon has a better resolving power for blue light.

However, it is also possible to use only one phosphor. In order to obtain the desired attenuation the transmission wavelength band of the Fabry-Perot interferometer must have such a small half width and be so shifted with respect to the wavelength band emitted by the phosphor that the quantity of light incident on the target of the camera tube remains substantially constant both during positioning and during an exposure. This embodiment is also suitable for compensating for brightness variations in a zoom device. The brightness variation which occur are of the order of a factor 10. In an X-ray display device having a zoom device both described methods may be combined, if desired.

A tunable Fabry-Perot interferometer of the kind described in the opening paragraph is preferably characterized according to the invention in that the reflection coefficient of the mirrors in the fully visible wavelength range is 99% or more and the distance between the mirrors can be varied by means of the continuously adjustable spacing element at least over a distance equal to $\frac{1}{2}\lambda$, preferably between 0 to $\frac{1}{2}\lambda$ or $\frac{1}{4}\lambda$ and $\frac{3}{4}\lambda$, where $\lambda$ is a wavelength at the center of the wavelength range. This is based on recognition that the half width of the transmission wavelength band is determined both by the distance (d) between the mirrors and the reflection coefficient (R) of the mirrors. With mirrors having a reflection coefficient of 99% or more in the fully visible wavelength range, the half width of the transmission wavelength band will be 50 nm or less, and this will be further described hereinafter. Mirrors having a reflection coefficient of 99% or more can be made (see FIG. 2).

A preferred embodiment of a tunable Fabry-Perot interferometer is characterized in that the continuously adjustable spacing element is provided coaxially about at least one of the supports and comprises a cylindrical, axially extensible electrostrictive or magnetostrictive element, and at least one of the supports is provided with a flange extending in the radial direction to which the spacing element is connected.

By giving the flange of the support on the side facing the other support a coaxial, annular recess which is present between the contact face associated with the spacing element and the central part of the support, the support and the mirror provided thereon of the tunable Fabry-Perot interferometer is less deformed during the movement.

The spacing distance between the two mirrors is initially adjusted by at least one layer provided on a contacting surface of the support or of the spacing element. During vapour deposition of the mirrors the layer may also be provided by vapour deposition.

The electrostrictive or magnetostrictive element need not be cylindrical but may be constructed from two or more rods.

Figure 2:
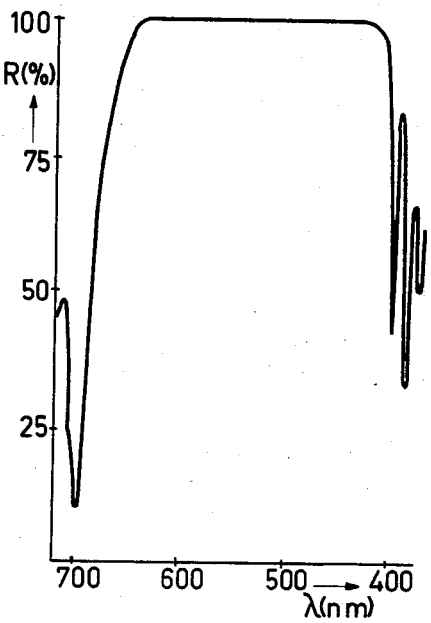
Figure 3:
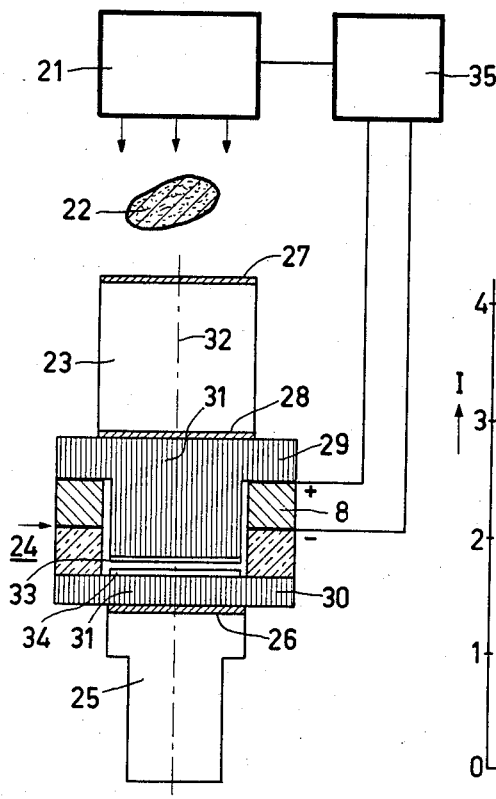
Figure 4:
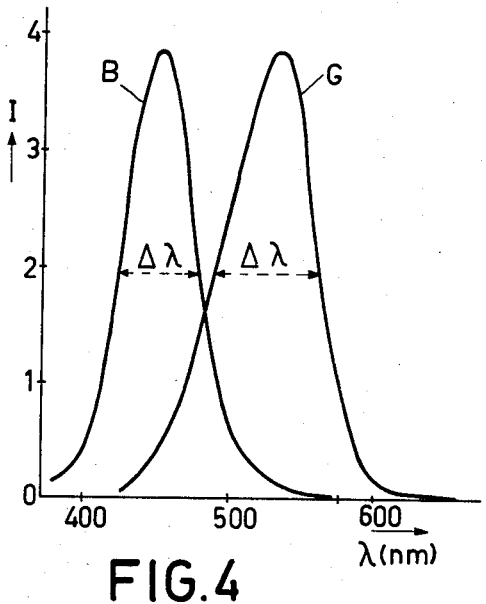

Embodiments of the invention will now be described in greater detail, by way of example, with reference to a drawing, in which:

FIG. 1 is a sectional view of a tunable Fabry-Perot interferometer according to the invention, FIG. 2 shows the measured reflection as a function of the wavelength of a useful mirror, FIG. 3 shows diagrammatically an X-ray device having a tunable Fabry-Perot interferometer according to the invention, and FIG. 4 shows the spectrum of a mixture of two phosphors.

FIG. 1 is a sectional view of a tunable Fabry-Perot interferometer according to the invention. Mirrors 3 and 4 consisting of dichroic layers having a reflection coefficient which is 99% or more are provided on the glass supports 1 and 2. The glass support 1 preferably consists of a central part 11 having a radially extending flange 12 against which the spacing element 5 is connected. In order to prevent deformation of the mirror 3 the flange 12 of the support 1 has a coaxial annular recess 13 on the side facing the support 2, which recess 13 is present between the contact surface 14 with the spacing element 5 and the central part 11 of the support 1. The spacing element 5 consists of a ring 8 of electrostrictive material having two electrodes 6 and 7, a glass ring 9 and a number of vapour-deposited layers 10 by means of which the output distance between the mirrors is adjusted. Instead of a single ring of piezo-electric material, a plurality of rings may be used each having electrodes. It is also possible to use a magnetostrictive element. The output distance between the parallel mirrors in this case is 0.5 $\lambda_{(o)}$, with $\lambda_{(o)} = 500$ nm so that the peak of the transmission wavelength band is at 500 nm. The distance between the mirrors may be varied from, for example, 0.1 $\lambda_{(o)}$ to 2$\lambda_{(o)}$, in which the transmission curve of the wavelength band to be passed may be moved throughout the whole visible wavelength range. The half width ($\Delta\lambda$) of the transmission wavelength band for a number of reflection coefficients R, is recorded in the following table

| $\Delta\lambda$ (nm) | R (%) |
| --- | --- |
| 10 | 99.8 |
| 20 | 99.6 |
| 30 | 99.4 |
| 40 | 99.2 |
| 50 | 99.0 |

It is possible to manufacture mirrors which have such a very high reflection coefficient over the entire visible wavelength range. FIG. 2 shows the measured reflection R (in %) as a function of the wavelength $\lambda$ (nm) of a 43-layer-mirror. The layers of this mirror have an optical thickness of 0.25 $\lambda_{(o)}$ ($\lambda_{(o)} = 550$ nm) and consist alternately of $TiO_2$ and $SiO_2$. The absorption in the mirror is particularly small. The reflection coefficient of the mirror is between 99 and 100% for light having a wavelength between 410 and 650 nm.

FIG. 3 shows diagrammatically an X-ray device in which a tunable Fabry-Perot interferometer according to the invention is used. The X-ray device comprises a source of X-ray radiation 21 to which the object 22 to be examined is exposed, a control unit 35, and an X-ray display device which comprises an image intensifier 23, a tunable Fabry-Perot interferometer 24 and a TV camera tube 25 having a target 26. The image intensifier 23 has an input screen 27 on which an image of the object 22 (for example the patient) is projected by means of X-ray radiation, and this image is visible displayed on the display screen 28 in an intensified form. The Fabry-Perot interferometer 24 has substantially the same construction as the interferometer shown in FIG. 1. The supports 29 and 30 are provided with mirrors 33 and 34, respectively, and consist in this case of bundles of glass fibers with fibers 31 extending parallel to the axis 32 of the Fabry-Perot interferometer. The fibers 31 relay the visible image or the display screen 28 to the target 26 of the camera tube, after which further electronic processing of the picture takes place. The display screen 28 consists of a mixture of two phosphors having a spectrum as shown in FIG. 4. In this figure the intensity I (in arbitrary units) is displayed as a function of the wavelength $\lambda$(nm) for a blue phosphor (B) and a green phosphor (G). The ratio between the quantities of the phosphors is chosen to be such that the intensity of the light generated by the green phosphor is 100× stronger than the intensity of the light generated by the blue phosphor for the same incident intensity. The source of X-ray radiation 21 is adjusted to provide a low intensity by means of the control unit 35 and the Fabry-Perot interferometer is tuned so that exclusively the light of the green phosphor is passed. With this adjustment made, the object 22 is positioned in the device. The intensity of the source of X-ray radiation 21 is then adjusted to be a hundred times greater to make a radiographic exposure and at the same time the Fabry-Perot interferometer is returned by means of the electrostrictive ring 8 in such manner that only light from the blue phosphor is passed. By the choice of the mixture ratio of the phosphor and of the tuning of the Fabry-Perot interferometer, an image will be incident on the target 26 of the camera tube 25 which will have approximately the same brightness both during alignment and during the making of a radiographic exposure.

By using the Fabry-Perot interferometer as a light attenuator the condition in which the camera tube is overdriven upon making an X-ray record can be prevented.

What is claimed is:

1. A Fabry-Perot interferometer having a tunable transmission wavelength and comprising two facing mirrors which are situated at a very small distance from each other and extend at right angles to the axis of said interferometer, said mirrors being provided on supports, said supports being interconnected by means of an axially continuously adjustable spacing element, characterized in that said supports consists of bundles of optical fibers and said mirrors are provided on ends of said optical fibers.

2. A tunable Fabry-Perot interferometer as claimed in claim 1, characterized in that said distance between said two mirrors is initially adjusted by at least one layer provided on one of the mutually contacting surfaces of said supports and said spacing element.

3. An X-ray display device comprising a display screen and a television camera tube, characterized in that a Fabry-Perot interferometer as claimed in claim 11 is provided in the light path between said display screen and said television camera tube.

4. An X-ray display device as claimed in claim 3, characterized in that said display sceen comprises at least two phosphors luminescing with different colours, wherein the quantity of light generated upon irradiation with the same X-ray intensity, by one of said two phosphors is 10 to 100 times as great as that generated by the other of said two phosphors.

5. A Fabry-Perot interferometer having a tunable transmission wavelength comprising two facing mirrors situated at a very small distance from each other and extending at right angles to the axis of said interferometer, said mirrors being provided on supports, said supports being interconnected by a spacing element, said spacing element being continuously adjustable in the axial direction, wherein the improvement comprises said mirrors having a reflection coefficient in the fully visible wavelength range of at least 99%, and said distance between said mirrors being variable by said continuously adjustable spacing element at least over a wavelength distance equal to $\frac{1}{2}$a wavelength at the center of said wavelength range.

6. A Fabry-Perot interferometer according to claim 5, wherein said wavelength distance ranges between 0 and $\frac{1}{2}$ of said wavelength.

7. A Fabry-Perot interferometer according to claim 5, wherein said wavelength distance ranges between $-\frac{1}{4}$ and $\frac{1}{4}$ of said wavelength.

8. A Fabry-Perot interferometer according to claim 5, wherein said distance between said two mirrors is initially adjusted by at least one layer on one of the mutually contacting surfaces of said supports and said spacing element.

9. A Fabry-Perot interferometer according to claim 5, wherein said supports consist of bundles of optical fibers, and said mirrors are provided at ends of said optical fibers.

10. A Fabry-Perot interferometer according to claim 9, wherein said distance between said two mirrors is initially adjusted by at least one layer on one of the mutually contacting surfaces of said supports and said spacing element.

11. A Fabry-Perot interferometer according to claim 9, wherein said spacing element is provided coaxially about at least one of said supports, said spacing element comprising a cylindrically axially extensible electrostrictive or magnetostrictive element, and wherein at least one of said supports has a radially extending flange connecting said spacing element.

12. A Fabry-Perot interferometer according to claim 11, wherein said flange has a coaxial annular recess on a side facing the other of said supports, said recess being present between a contact face associated with said spacing element and a central part of said one support.

* * * * *

UNITED STATES PATENT AND TRADEMARK OFFICE
CERTIFICATE OF CORRECTION

PATENT NO. : 4,547,801

DATED : October 15, 1985

INVENTOR(S) : JAN HAISMA ET AL

It is certified that error appears in the above-identified patent and that said Letters Patent is hereby corrected as shown below:

In the Claims:

Claim 1, line 8, change "consists" to --consist--;

Claim 3, line 3, change "claim 11" to --claim 1--.

Signed and Sealed this

Twenty-third Day of September 1986

[SEAL]

Attest:

DONALD J. QUIGG

Attesting Officer

Commissioner of Patents and Trademarks